W. F. GOODWIN.
Harvester Rake.
No. 55,487. Patented June 12, 1866.
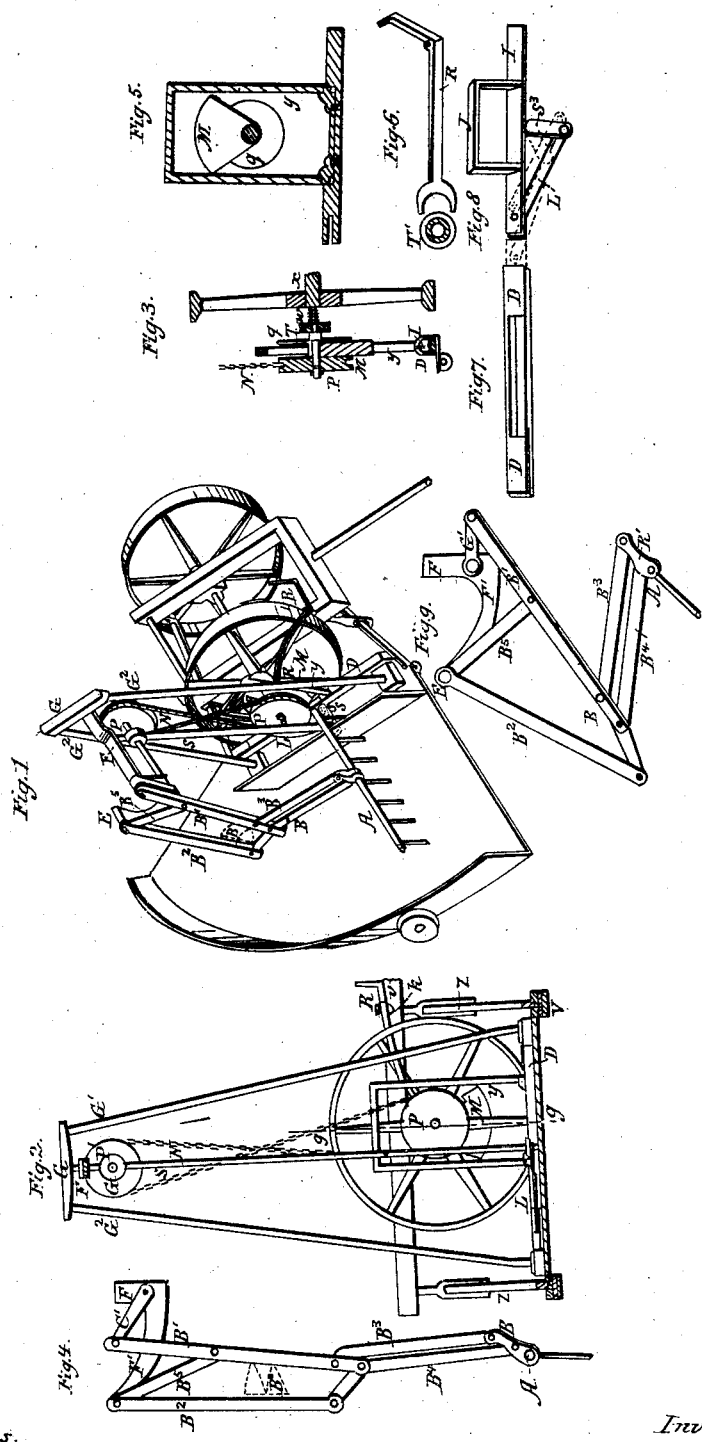

UNITED STATES PATENT OFFICE.

WILLIAM F. GOODWIN, OF WASHINGTON, DISTRICT OF COLUMBIA.

IMPROVEMENT IN HARVESTER-RAKES.

Specification forming part of Letters Patent No. 55,487, dated June 12, 1866.

*To all whom it may concern:*

Be it known that I, WILLIAM F. GOODWIN, of the city and county of Washington, and District of Columbia, have invented certain new and useful Improvements in Harvesters; and I do hereby declare the following to be a full, clear, and exact description of the nature, construction, and operation of the same, reference being had to the accompanying drawings, which are made part of this specification, and in which—

Figure 1 is a perspective view, showing a plan of a harvester embodying my improvements. Fig. 2 is a side elevation, showing the rake and platform cut away. Fig. 3 is a vertical section through the driving apparatus by which motion is imparted to the several parts operating the rake, the dotted line J' J', Fig. 2, indicating the plan of section. Fig. 4 is a detached part of the arm F, with its projection F', and showing the position of the arm B when the crank C' is in the position indicated in this figure. Fig. 5 is a vertical section through the yoke Y and sliding bar I, showing the vibrating joints by which the yoke is attached to the bar. Fig. 6 is a detached view of the lever R and clutch-box T'. These devices serve to throw the driving apparatus which imparts motion to the rake out of gear with the axle X, which permits the axle to turn in the cam M and pulleys P and stops the motion of the rake at the will of the driver. Fig. 7 is a detached view of the guide-box D, in which slides the bar I. (See Fig. 1.) Fig. 8 is a detached view of the bar I, yoke Y, link L, and crank $S^3$. This figure represents the yoke in perspective, with its top swung off to one side, showing the flexibility of the joints where the yoke is attached to the bar I. The red lines indicate the different positions of the link L and crank $S^3$ when the bar moves forward and backward in the guide-box D. Fig. 9 is a side view of the arm B, showing the position of the arm when the crank C' is in the position indicated, and showing the rake elevated.

Similar letters of reference indicate corresponding parts in the several figures.

This improvement relates to mechanism for operating the rake for the purpose of raking grain from the platforms of reaping-machines. The apparatus is attached to and travels with the harvester, and serves to rake the grain from the platform and deposit it on the ground in gavels sufficiently large to form a sheaf.

The construction is simple and very efficient in operation, and can be attached to different varieties of reaping-machines.

To enable others skilled in the art to which my invention appertains to fully understand and use the same, I will proceed to describe it in connection with the accompanying drawings.

The platform is represented as constructed to permit the grain to be swept off at one side, the gavel being delivered on the ground in rear of the driving-wheels. The apparatus for operating the rake is mounted partly on the side of the platform, near the driving machinery of the reaper, and partly on the axle X, which is extended sufficiently to receive it. The shape of the platform being curvilinear, the movements of the rake are made to correspond therewith.

As this application has exclusive reference to the devices by which the rake is operated, I will limit the description to such devices, and refer to parts of the reaping apparatus only by way of elucidation.

A is the rake, which is attached to the lower extremity of the arm B by passing the head of the rake A through a hole in the short bar or finger $B^6$, which is the lower extremity of the arm B. The arm B is composed of six pieces or bars, all attached to each other and securely fastened together by bolts or rivets, making hinged or vibrating joints at the several points of attachment, which arrangement of joints permits the arm to bend in any required way or direction in performing its movements when acted upon by the crank C'. A hole in the top of the front bar, B', is fitted over the wrist or journal of the crank C', and hinged or bolted at its lower end to the bars $B^3$ and $B^4$, and at a distance of about two-fifths of its length, measuring from the top, it is pivoted to the link or short bar $B^5$. The link or bar $B^5$ is pivoted on the journal or stud E on the end of the projection F'. The bar $B^2$ is also pivoted at its top to the stud or journal E and at its lower end to the projecting end of the bar $B^4$. The bar $B^4$ is pivoted or hinged at its lower end to the short bar $B^6$. The bar $B^3$ is also connected to the top of the bar $B^6$ and at its top end to the bar B'. These connections of bars complete the construction of the arm B. Its operation will be hereinafter described in connection with other movements.

G, G', and $G^2$ are the supports which hold up the mowing devices in their vertical or upright position. G' and G² are posts or standards having their lower ends fastened rigidly to the platform and standing in a vertical position at right angles with the floor of the platform, being vertical to and moving with the same. The feet or lower ends of the standards are placed on a vertical line over the hinges which connect the platform to the driving apparatus of the reaper. G is a cap or cross-head, which is fastened to the tops of the standards and secures them together. This arrangement might be made in one piece by bending a bar of iron in proper shape. The standards are set apart to permit the mowing apparatus to swing between them. The cap G is provided with a hole in its center, into which passes the journal S². The journal S² is fastened into the swinging arm F perpendicularly over the journal S'. The axes of the two journals are the same, passing through the pulleys in a vertical plane with the standards. These journals are the centers on which swings the crank S³. The arm F is supported and swung by the crank-rod S and carries with it the arm B, which also carries the rake. The lower end of the rod S is set on the end of the crank S³ and fastened at its top to the arm F at a distance from the journal S² equal to the length of the crank S³. This arrangement permits the pulleys P and P' to occupy a vertical position between the centers of the journals S² and S' and in line with vibrating joints of platform.

F is a swinging arm, bent down at both ends to afford bearings for the shaft C, on which the pulley P' is mounted.

F' is a projection from the arm F, extending backward, supporting on its end the pin or journal E, on which the bars B² and B⁵ are pivoted.

C is a shaft which passes through the rod or post S near its top, and through holes in the bent-down ends of the arm F, which afford bearings for the shaft C. On one end of the shaft C is mounted a crank, C', the wrist of which bears or carries the top end of bar B', and on the other end is mounted a chain-gear pulley, which is fastened to the shaft C, and by which the shaft is made to rotate.

N is a chain the links of which are formed to lock or gear in the pulleys P and P'. The chain is crossed to reverse the movement of the pulley, the crank C' requiring a backward or reversed movement to that of the pulley P, which, being mounted on the axle X, moves forward with the driving-wheel.

P is a chain-gear pulley of the same diameter and corresponding in gear with the pulley P', each having the same number of meshes or locks. The pulley P is fastened to the cam M, both moving together, both being fitted loosely over the end of the axle X, which is extended for the purpose of receiving them. The pulley and cam are thrown into gear with the clutch T and caused to rotate forward with the axle X when the machine is in operation moving forward. The clutch T is fast to the cam M, and when geared with the clutch T' rotates with the axle X. The clutch T' is fitted loosely over the axle X and slides on it. A projection on the axle X fits into a groove or slot cut lengthwise in the sleeve or box of the clutch, which prevents it from turning on the axle, but admits of it being thrown in and out of gear by the forked lever R. The clutch is held in gear when the machine is moving forward by the spring W, which admits of the clutch backing out of gear when the machine moves backward.

q is a flange fastened on the side of the cam to retain the yoke Y in position and prevent its falling off from the cam, the pulley P preventing it from falling off on the other side.

Y is a cam-yoke, made sufficiently long to permit the cam to vibrate up and down in the yoke. It is hinged at its lower ends to the sliding bar I. By this arrangement the yoke Y is permitted to work loosely between the pulley P and flange q, thus permitting the platform to vibrate when passing over rough ground without interfering with the movements of the rake. The cam M fits closely between the upright bars of the yoke Y. When the cam rotates in the yoke, causing it to move forward and backward, the yoke, being fastened to the bar I by hinged joints, causes the bar I to move forward and backward in its guide-box D.

L is a link attached at one end to the bar I by a hinge-joint and at its other end to the crank S³, or to the end of the rod S, by a pin or bolt, which permits the link to vibrate. This arrangement forms the connection between the cam M and the cranks S and S'. When the cam rotates the bar I is moved forward and backward once in every revolution of the driving-wheel, at the same time swinging the crank or rod S, which carries the arm F. By this arrangement the arm B, which carries the rake, is swung forward and backward over the platform once every revolution of the driving-wheel, the rake partly rotating around the centers of the journals S² and S³, conforming to the circular shape of the platform. But the motion of the rake may be stopped and the rake detained while a sufficient amount of grain is falling on the platform to form the gavel for a sheaf by the driver placing his foot against the end of the lever R and throwing the clutch out of gear.

R is a forked lever, bent so as to bring one end convenient for the driver to place his foot against, and the other end is forked and fits over the clutch T' in a groove made to receive it. The lever R is hinged at its bend to the projection K, which projects from the frame U.

D is a guide-box placed horizontal on the platform, to guide the sliding bar I and to hold it in place.

Having thus described the construction of the different parts of this improvement and the manner of putting them together, I will proceed to describe the movements of the same.

The platform is represented as being attached to the driving machinery of the reaper by means of the two vibrating bars marked Z, one end of which bars is hinged or pivoted to the driving apparatus and the other end is hinged to the platform by a bolt passing through the eye marked V, and through the ends of the bars. This arrangement admits of the platform vibrating up and down when passing over rough, uneven ground. The vibrating of the platform has made it difficult heretofore to adapt an automaton-rake to this peculiar style of reaper, as the motive power of the rake must be derived from the driving apparatus of the machine.

This improvement obviates the above-mentioned difficulty in the heretofore and hereinafter described manner.

First, the axle X is extended over the platform sufficiently to permit the pulley P, which is mounted on its end, to stand perpendicularly under the pulley P' and between the centers of the journal $S^2$ and S', and also in line with the standards G' and $G^2$. The center of the pulley P' is always in line with the standards, the centers of which stand on the platform perpendicularly over the vibrating joints V. By this arrangement the pulleys may vibrate as much as is required to insure the working of the apparatus. The chain is placed on the pulleys, having slack sufficient to admit of all the vibration of the machine which would occur in traveling over rough ground. The gear or meshes of the pulleys are so constructed that the chain cannot slip nor miss a link, and cannot easily be thrown out of gear, and will work with slack sufficient to admit of the vibrating of the platform.

The upright bars of the yoke Y are made sufficiently long to permit the cam M to move up and down within the yoke and to admit of the raising and lowering of the platform. The yoke fits loosely between the flange Q and the pulley P, which arrangement permits the yoke to vibrate on its hinges. The face of the cam is sufficiently wide to permit the yoke to play from side to side; but the cam fits closely between the upright bars of the yoke, and when rotating forces the yoke forward and backward without loss of motion. The yoke being attached to the bar I, as shown in Fig. 5, moves the bar with it, imparting motion by means of the link L to the crank $S^3$, as indicated. (See Fig. 8.)

Two distinct movements are employed to operate the rake. One derives its motion from the cam M by means of the yoke Y, bar I, and link L, which operates the crank $S^3$, which is a part of the supporting-rod S, by which the arm F and shaft C, with their attachments, are supported, and by which they are partly rotated, swinging forward and backward horizontally over the platform once every revolution of the driving-wheel. This movement serves to give the rake its curvilinear sweep. The other movement derives its motion from the pulley P by means of the chain N acting upon the pulley P', which revolves the shaft C and crank C', on the wrist or journal of which the top end of the bar B' is pivoted. The chain is crossed to reverse the movement of the pulley, which causes the crank to turn backward. The rotating of the crank causes the arm B to assume various positions. (See Figs. 1, 4, and 9.) Fig. 1 represents the rake descending upon the platform when the cam M has forced the yoke forward. Fig. 2 represents the position of the cam M when the rake has descended to the platform by the straightening out of the arm B, and the arm B has commenced to make its stroke by swinging on the stud or journal E. When the arm B is in this position the cam M, rotating, forces the yoke backward and finishes the stroke, which sweeps the grain from the platform. The crank C', rotating, carries the top of the bar B' forward, which movement increases the distance from the top of the bar B' to the journal E, swinging the bar B' on its pivot at the end of the bar $B^5$, which raises the lower end of the bar B', bringing it closer to the journal E and raising with it the bars $B^4$ and $B^3$, the bar $B^2$ being pivoted at its top to the journal E and at its lower end to the projecting end of the bar $B^4$, holding the short end of the bar $B^4$ always at the same distance from the journal E. The bar $B^4$, being pivoted to the lower end of the bar B', which moves to and from the journal E, elevates and depresses the rake. The bar $B^3$, being hinged at one end to the top of the short bar $B^6$ and at the other end to the bar B', causes the rake to rise up when the arm B is bent in the act of stepping forward, or, in other words, while making its ineffective stroke, and to straighten out while descending upon the platform and remain straight while making its backward or effective stroke.

Having thus described my invention, what I claim as new, and desire to secure by Letters Patent, is—

1. The standards G' and $G^2$ and cap G, arranged for the purpose and to operate in the manner substantially as described.

2. The cam M, flange $q$, yoke Y, bar I, guide-box D, link L, crank $S^3$, journals S' and $S^2$, rod S, bar F, with its projection F', and stud E, arranged to operate in the manner and for the purpose substantially as described.

3. The pulleys P and P', chain N, shaft C, and crank C', arranged to operate in the manner and for the purpose substantially as described.

4. The bars B', $B^2$, $B^3$, $B^4$, $B^5$, and $B^6$, constructed and arranged to form the jointed arm B, to operate in the manner and for the purpose substantially as described.

WM. F. GOODWIN.

Witnesses:
CHARLES D. SMITH,
CHARLES A. PETTIT.